US011847446B2

(12) United States Patent
Rafey

(10) Patent No.: US 11,847,446 B2
(45) Date of Patent: Dec. 19, 2023

(54) PREDICTIVE BUILD QUALITY ASSESSMENT

(71) Applicant: Dell Products, L.P., Round Rock, TX (US)

(72) Inventor: Mohammad Rafey, Bangalore (IN)

(73) Assignee: Dell Products, L.P., Round Rock, TX (US)

(\*) Notice: Subject to any disclaimer, the term of this patent is extended or adjusted under 35 U.S.C. 154(b) by 191 days.

(21) Appl. No.: 17/205,087

(22) Filed: Mar. 18, 2021

(65) Prior Publication Data

US 2022/0300280 A1 Sep. 22, 2022

(51) Int. Cl.
*G06F 8/77* (2018.01)
*G06F 11/36* (2006.01)
*G06F 8/73* (2018.01)
*G06N 3/04* (2023.01)

(52) U.S. Cl.
CPC .............. *G06F 8/77* (2013.01); *G06F 8/73* (2013.01); *G06F 11/3664* (2013.01); *G06N 3/04* (2013.01)

(58) Field of Classification Search
None
See application file for complete search history.

(56) References Cited

U.S. PATENT DOCUMENTS 8,615,589 B1\* 12/2013 Adogla ................ G06F 9/5077
                                                        709/226
2012/0197626 A1\* 8/2012 Kejariwal ........... G06F 11/3419
                                                        717/124

(Continued)

FOREIGN PATENT DOCUMENTS

WO    WO-2022046061 A1 \*  3/2022

OTHER PUBLICATIONS

J. Finlay, R. Pears and A.M. Connor, "Data Stream Mining for Predicting Software Build Outcomes Using Source Code Metrics," Information & Software Technology, vol. 56, No. 2, pp. 183-198, 2014, doi: 10.1016.INFSOF.2013.09.001. (Year: 2014).\*

(Continued)

*Primary Examiner* — Andrew M. Lyons
(74) *Attorney, Agent, or Firm* — Amin, Turocy & Watson, LLP

(57) ABSTRACT

Predictive build quality assessment is disclosed, e.g., to predict performance of a candidate software build prior to deploying the candidate software build in a production environment. An example method can include comparing performance of a candidate software build with performance data associated with clusters of previous builds. A cluster having similar performance to the candidate software build can be selected. A source code graph for the candidate software build can be compared to source code graphs of builds included in the selected cluster. A previous build in the cluster, which is associated with a source code graph that is similar to the candidate software build's source code graph, can be selected. Individual performance data associated with the selected previous build can be inferred to be the predicted performance of the candidate software build, thereby informing decision making regarding further testing, modification, and/or deployment of the candidate software build into production.

20 Claims, 13 Drawing Sheets

(56) References Cited

U.S. PATENT DOCUMENTS

| | | | | |
|---|---|---|---|---|
| 2013/0268916 | A1* | 10/2013 | Misra | G06F 8/75 |
| | | | | 717/123 |
| 2014/0115403 | A1* | 4/2014 | Rhee | G06F 11/3466 |
| | | | | 714/38.1 |
| 2014/0302837 | A1* | 10/2014 | Ronen | H04W 24/08 |
| | | | | 455/418 |
| 2015/0067651 | A1* | 3/2015 | Hoffmann | G06F 11/323 |
| | | | | 717/125 |
| 2017/0046510 | A1* | 2/2017 | Chen | G06F 21/552 |
| 2019/0332376 | A1* | 10/2019 | Borra | G06F 11/3442 |
| 2020/0089485 | A1* | 3/2020 | Sobran | G06F 18/23213 |
| 2020/0327118 | A1* | 10/2020 | Ahmed | G06F 8/433 |
| 2020/0348984 | A1* | 11/2020 | Giannetti | G06F 9/5083 |
| 2020/0351283 | A1* | 11/2020 | Salunke | H04L 63/1425 |
| 2021/0182031 | A1* | 6/2021 | Ye | G06F 8/77 |
| 2022/0138068 | A1* | 5/2022 | Dal Zotto | G06F 11/302 |
| | | | | 714/47.1 |
| 2022/0188104 | A1* | 6/2022 | Wan | G06F 16/24526 |

OTHER PUBLICATIONS

R. Ibba, D. Natale, P. Benedusi and R. Naddei, "Structure-based clustering of components for software reuse," 1993 Conference on Software Maintenance, Montreal, QC, Canada, 1993, pp. 210-215, doi: 10.1109/ICSM.1993.366941. (Year: 1993).*

Y. Kanellopoulos, P. Antonellis, C. Tjortjis and C. Makris, "k-Attractors: A Clustering Algorithm for Software Measurement Data Analysis," 19th IEEE International Conference on Tools with Artificial Intelligence(ICTAI 2007), Patras, Greece, 2007, pp. 358-365, doi: 10.1109/ICTAI.2007.31. (Year: 2007).*

S. Zhong, T. M. Khoshgoftaar and N. Seliya, "Analyzing software measurement data with clustering techniques," in IEEE Intelligent Systems, vol. 19, No. 2, pp. 20-27, Mar.-Apr. 2004, doi: 10.1109/MIS.2004.1274907. (Year: 2004).*

"SPSS algorithms," https://dataplatform.cloud.ibm.com/docs/content/wsd/spss_algorithms.html, 2 pages.

Hrehova, "Predictive model to evaluation quality of the manufacturing process using Matlab tools," International Conference on Manufacturing Engineering and Materials, ICMEM 2016, Jun. 6-10, 2016, 6 pages.

Schmitt et al., "Predictive model-based quality inspection using Machine Learning and Edge Cloud Computing," Advanced Engineering Informatics, vol. 45, Aug. 2020, 101101, 10 pages.

* cited by examiner

| Performance Metrics (M) | Score (S) | Normalized Score (Scale 0 to 1) | Categorical Score |
|---|---|---|---|
| CPU Utilization (%) | 100 | 1.00 | A |
| Memory Utilization (%) | 34 | 0.12 | A |
| Memory Used (%) | 25 | 0.01 | B |
| System Load Average | 67 | 0.56 | B |
| Apdex Scores | 56 | 0.41 | D |
| Error Rates | 45 | 0.26 | B |
| Request Latency | 100 | 1.00 | C |
| Request Error Rate | 34 | 0.12 | C |
| Mean Time Between Failures (MTBF) | 25 | 0.01 | A |
| Mean Time To Recover/Repair (MTTR) | 67 | 0.56 | D |
| Unplanned Downtime | 56 | 0.41 | C |
| Unhandled Exception Rate | 45 | 0.26 | C |
| Handled Exception Rate | 89 | 0.85 | B |
| Memory Leakages Instances | 100 | 1.00 | C |
| CPU Utilization (%) | 25 | 0.01 | B |
| Memory Utilization (%) | 67 | 0.56 | D |
| Memory Used (%) | 56 | 0.41 | D |
| Apdex Scores | 89 | 0.85 | C |
| Error Rates | 100 | 1.00 | C |
| Request Rate | 34 | 0.12 | A |
| Request Latency | 25 | 0.01 | B |
| Request Error Rate | 67 | 0.56 | B |
| Mean Time Between Failures (MTBF) | 56 | 0.41 | C |
| Mean Time To Recover/Repair (MTTR) | 45 | 0.26 | B |
| Unplanned Downtime | 89 | 0.85 | D |
| Memory Leakages Instances | 25 | 0.01 | B |
| Connection Pool Utilization | 67 | 0.56 | C |
| Memory Utilization (%) | 45 | 0.26 | D |
| Change Failure Percentage (%) | 34 | 0.34 | C |
| Test Coverage Ratio (%) | 23 | 0.96 | A |
| App Crash Rate (%) | 67 | 0.26 | C |
| App Crashes Per User (%) | 56 | 0.01 | D |
| App Crashes Per Session (%) | 78 | 0.85 | A |
| App Crashes Per Proc Call Window (%) | 45 | 0.96 | A |
| Custom Quantified Biz User Feedback | 34 | 0.26 | D |
| Custom Quantified Test User Feedback | 89 | 0.85 | B |
| Custom Quantified Ops Feedback | 78 | 0.96 | A |
| Max CPU Usage Overshot (%) | 67 | 0.01 | D |
| Max Memory Usage Overshot (%) | 98 | 0.26 | D |
| Max Storage Usage Overshot (%) | 76 | 0.01 | D |
| Custom Perf Metric 1 | 43 | 0.96 | A |
| Custom Perf Metric 2 | 23 | 0.85 | A |
| Custom Perf Metric 3 | 36 | 0.65 | C |
| Custom Perf Metric N | 56 | 0.85 | A |

FIG. 3

```
import numpy as np
import pandas as pd
import gower

Xd=pd.DataFrame({'cpu_utilization' : [A, B, D, C, D, C, B, D, A],
    'memory_utilization' : [A, B, D, C, D, C, B, D, A],
    'memory_used' : [A, B, D, C, D, C, B, D, A],
    'error_rates' : [A, B, D, C, D, C, B, D, A],
    'system_load_average' : [A, B, D, C, D, C, B, D, A],
    'apdex_scores' : [A, B, D, C, D, C, B, D, A],
    'request_latency' : [A, B, D, C, D, C, B, D, A],
    'request_error_rate' : [A, B, D, C, D, C, B, D, A],
    'mean_time_between_failures' : [A, B, D, C, D, C, B, D, A],
    'mean_time_to_recover_repair' : [A, B, D, C, D, C, B, D, A],
    'unplanned_downtime' : [A, B, D, C, D, C, B, D, A],
    'unhandled_exception_rate' : [A, B, D, C, D, C, B, D, A],
    'handled_exception_rate' : [A, B, D, C, D, C, B, D, A],
    'memory_leakages_instances' : [A, B, D, C, D, C, B, D, A],
    'cpu_utilization' : [A, B, D, C, D, C, B, D, A],
    'memory_utilization' : [A, B, D, C, D, C, B, D, A],
    'app_crash_rate' : [A, B, D, C, D, C, B, D, A],
    'custom_quantified_test_user_feedback' : [A, B, D, C, D, C, B, D, A],
    'custom_perf_metric_1' : [A, B, D, C, D, C, B, D, A]})

Yd = Xd.iloc[1:3,:]
X = np.asarray(Xd)
Y = np.asarray(Yd)

# Gowers algorithm returns the top n clusters of build configurations
# based on above categorical perf data.
gower.gower_topn(Xd.iloc[0:2,:], Xd.iloc[:,:], n = 5)
```

FIG. 4

PREDICTIVE BUILD QUALITY ASSESSMENT

BACKGROUND

Enterprise software supports many of today's business, government, and individual activities. For example, enterprise software is used by banks to manage their interactions with customers and update account data. Enterprise software is used by e-commerce businesses to manage seller-customer interactions as well as supply chain and delivery. Enterprise software is used by airlines, government, healthcare, and virtually every other industry.

When enterprise software is upgraded, e.g., to add new features or fix bugs, a new software "build" is generated and tested prior to deploying the build into the "production environment," namely, the environment in which the enterprise software is live, with corresponding real and often expensive consequences for any bugs. The cost of fixing bugs, after enterprise software is deployed in a production environment, is much higher than the cost of fixing bugs beforehand, e.g., by identifying and fixing bugs through testing.

Continuous integration and continuous deployment (CICD) has become an organizing principle to automate complex software delivery processes. The principle acts as a techno-functional gateway to ensure quality builds deploy in production environments.

With the increase in the number of software installables in the form of microservices, a typical enterprise software application often comprises thousands of microservices, each of which may have multiple versions. Measuring and predicting the quality and stability of build configurations in production environments is a complex task, and intelligently automating the management of such build configurations is further challenging.

Existing approaches for measuring software build quality and subsequent decision making has certain limitations. First, while unit, integration and functional tests are adequate for judging source code quality, such tests do not necessarily lead to sufficient performance of builds in production environments. Tests can be frequent and can be verified using builds that automate regression testing to detect integration errors as soon as possible; however, as a codebase grows and matures, the regression test suite for the codebase tends to grow as well, to the extent that running a full regression test might require hours of processing time. Although tests are created to find bugs, flawed tests are often the cause of problems attributed to software. This happens when tests are poorly written, outdated or not suitable for a particular software application.

Second, while code coverage indicates a percentage of code covered with a unit test, this does not have much relevance with respect to how such code is going to perform in a production environment. Many times, unit tests are written just to obtain a favorable code coverage percentage to pass CICD threshold criteria, i.e., such testing can be manipulated.

Third, technologies, such as security scans, scans by Fortify®, Sonar Cube® or Checkmarx®, static source code analysis, analysis by StyleCop® and FxCop®, and dynamic code analysis on compiled outputs, target known vulnerabilities in code. While these technologies improve security and technical code quality, they do not guarantee good quality and functionally stable code in production.

Finally, some tools, such as Sealights®, provide features to compare a current build being deployed with an immediate last production quality build. However, the use of such a tool does not protect against possible issues found in other past historical builds, and many issues might not be present in an immediate last build. Also, effective use of such a tool depends on code coverage, testing metrics and other traditional software quality metrics, which can lead to flaws in the evaluation process.

In view of the foregoing, conventional approaches to measuring enterprise software build quality are inadequate, and are inadequate predictors of expected future performance behavior in production environments.

The above-described background is merely intended to provide a contextual overview of some current issues regarding conventional approaches to management of production environment software and builds, and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 3 illustrates example build performance data for use in connection with performance data comparisons, in accordance with one or more embodiments described herein.

FIG. 4 illustrates example code for use in connection with identifying clusters of previous builds based on previous build performance data, in accordance with one or more embodiments described herein.

DETAILED DESCRIPTION

Figure 1:
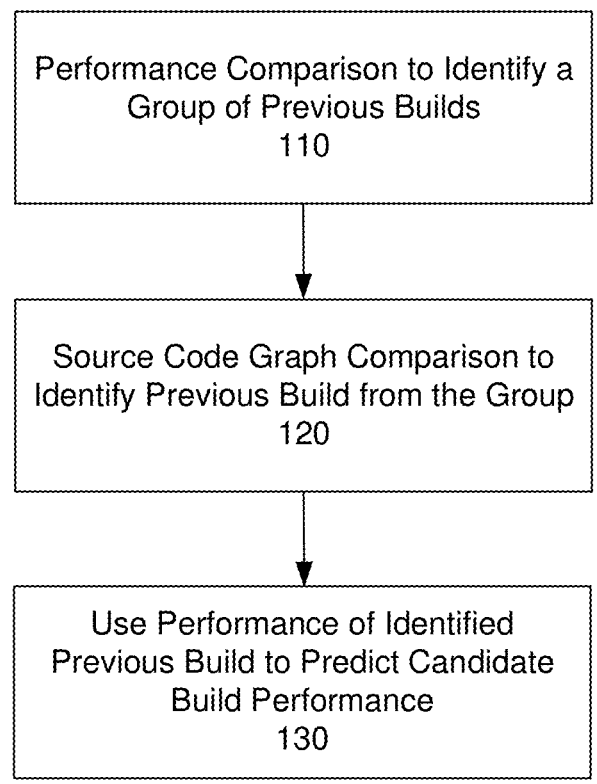
FIG. 1 illustrates an example overview of a multistage process to identify a previous build, in order to use the previous build performance data to predict performance of a candidate build, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As alluded to in the background, there is a need in the industry for novel approaches to measuring enterprise software build quality, and for better prediction of expected future performance behavior in production environments. In this regard, the subject application generally relates to enterprise software testing, and, for example, to predicting performance of enterprise software builds prior to deployment in production environments, and related embodiments.

Example embodiments are directed to predictive build quality assessment, i.e., predicting performance of a candidate software build prior to deploying the candidate software build in a production environment. The disclosed technologies include methods as well as devices, systems and computer readable media configured to carry out the disclosed methods. Some example methods can include comparing performance of a candidate software build with performance data associated with clusters of previous builds. A cluster having similar performance to the candidate software build can be selected. Next, a source code graph for the candidate software build can be compared to source code graphs of builds included in the selected cluster. A previous build in the cluster, which is associated with a source code graph that is similar to the candidate software build's source code graph, can be selected. The individual performance data associated with the selected previous build can be inferred to be the predicted performance of the candidate software build, thereby informing decision making regarding further testing, modification, and/or deployment of the candidate software build into production.

FIG. 1 illustrates an example overview of a multistage process to identify a previous build, in order to use the previous build performance data to predict performance of a candidate build, in accordance with one or more embodiments described herein. FIG. 1 includes a first operation 110, "performance comparison to identify a group of previous builds", a second operation 120, "source code graph comparison to identify previous build from the group", and a third operation 130, "use performance of identified previous build to predict candidate build performance".

The first operation 110, "performance comparison to identify a group of previous builds" can involve comparing test environment performance data associated with a candidate software build, namely, a build that is under test and has not yet been deployed into production, with production environment performance data associated with previous software builds, namely, builds that were previously deployed in a production environment. A result of the first operation 110 can be an identification of a group of previous software builds that generally have production environment performance data which is similar to the test environment performance data of the candidate software build. A more detailed discussion of the first operation 110 is further described in connection with FIGS. 2-5.

The second operation 120, "source code graph comparison to identify previous build from the group" can involve comparing a source code graph associated with the candidate software build to source code graphs associated with previous software builds in the group of previous software builds identified pursuant to the first operation 110. A result of the second operation 120 can be identification of a previous software build from the group which has a source code graph that is similar to that of the candidate software build. A more detailed discussion of the second operation 120 is further described in connection with FIGS. 6-9.

The third operation 130, "use performance of identified previous build to predict candidate build performance" can involve using the production environment performance data associated with the previous build identified pursuant to the second operation 120, to predict likely production environment performance associated with the candidate software build. In some embodiments, the production environment performance data associated with the previous build can be used, without substantial modification, as the predicted production environment performance data for the candidate software build. Decisions regarding whether or not to deploy the candidate software build can be made based on the predicted production environment performance data. If the candidate software build is not to be deployed, the predicted production environment performance data can optionally be used to guide modifications to the candidate software build.

The illustrated first operation 110 and second operation 120 can include a variety of subparts, as described herein, and the various subparts can be performed in any desired sequence, including sequences in which subparts of second operation 120 are performed before, between, or simultaneously with subparts of the first operation 110. In some embodiments, an example sequence can include, e.g., initially building and storing source code graphs of software builds deployed into the production environment, and measuring, grouping, and storing performance data associated with software builds deployed into the production environment.

Stored source code graphs and stored performance data groups can be used in connection with predicting performance of a candidate software build. The candidate software build's source code graph can be constructed, and the candidate software build's performance can be measured on production benchmarks comprising multiple factors. Next, the candidate software build's predicted performance can be ascertained in a two stage process. First, select a group of previous builds that has production environment performance data similar to the measured performance of the candidate software build. Second, compare the candidate build's source code graph with source code graphs associated with the group of previous builds, and select a previous build from the group based on similarity of the source code graphs. After this two stage process, predicted performance of the candidate software build, which is based on the performance of the selected previous build, can be analyzed and used to suggest a go/no-go decision regarding deploying the candidate software build into production.

In some embodiments, described further herein, a system can be configured to find clusters of similar software build configurations based on past historical production performance benchmarking data using an ensemble model comprising a first step and a second step. The first step can include categorical clustering using Gower's similarity Coefficients, which selects some of the most similar candidate build configurations from the most similar cluster found. The second step can include a deep source code graph level comparison using a graph convolutional neural network (GCNN) algorithm, to finally predict the expected production performance of the candidate build configuration, before the candidate build is deployed in production.

Figure 2:
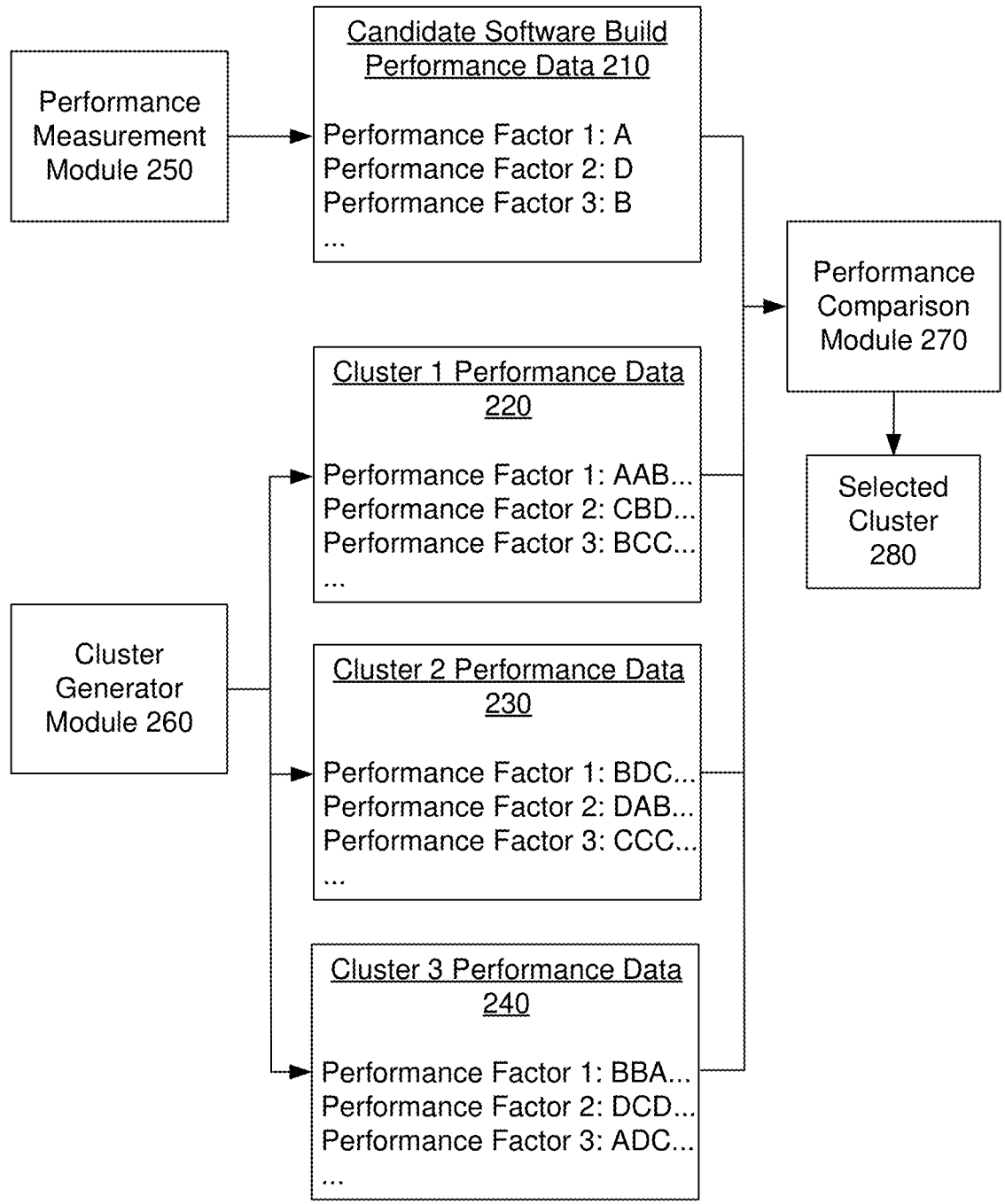
FIG. 2 illustrates an example first stage of the multistage process introduced in FIG. 1, wherein the first stage uses performance data comparisons to identify a cluster of previous builds, in accordance with one or more embodiments described herein.

FIG. 2 illustrates an example first stage of the multistage process introduced in FIG. 1, wherein the first stage uses performance data comparisons to identify a cluster of previous builds, in accordance with one or more embodiments described herein. FIG. 2 includes a performance measurement module 250 and candidate software build performance data 210. FIG. 2 further includes a cluster generator module 260, and cluster 1 performance data 220, cluster 2 performance data 230, and cluster 3 performance data 240. Finally, FIG. 2 includes a performance comparison module 270 and a selected cluster 280.

In FIG. 2, the performance measurement module 250 can measure multiple performance factors associated with a candidate software build, in order to generate the candidate software build performance data 210. The candidate software build performance data 210 can include, e.g., performance scores for performance factor 1, performance factor 2, performance factor 3, etc. Example performance data is illustrated in FIG. 3.

The cluster generator module 260 can identify clusters of previous software builds based on the previous software builds' performance data. The cluster 1 performance data 220 can include or otherwise represent performance data associated with a first identified cluster of previous software builds, the cluster 2 performance data 230 can include or otherwise represent performance data associated with a second identified cluster of previous software builds, the cluster 3 performance data 240 can include or otherwise represent performance data associated with a third identified cluster of previous software builds, etc. Different software builds included in an identified cluster can have different performance scores for any given performance factor, however, an identified cluster can include previous software builds having overall similarity in their performance data.

The performance comparison module 270 can compare the candidate software build performance data 210 with the cluster 1 performance data 220, the cluster 2 performance data 230, the cluster 3 performance data 240, and any other cluster performance data, in order to identify a cluster that has performance data similar to the candidate software build performance data 210. In some embodiments, a cluster associated with performance data most similar to the candidate software build performance data 210 can be selected as the selected cluster 280.

FIG. 3 illustrates example build performance data for use in connection with performance data comparisons, in accordance with one or more embodiments described herein. The illustrated build performance data can represent, e.g., production environment performance data or test environment performance data. The build performance data includes multiple performance metrics listed in the left column, also referred to herein as performance factors. A score column includes scores of the measured software build on each performance metric. A normalized score column includes normalized scores, which are calculated as a function of the scores. A categorical score column includes categorical scores, which are letter "grades" in the illustrated embodiment, and which are determined based on the normalized scores. Determining normalized and categorical scores, as shown, facilitates performance data comparisons.

The illustrated performance data shows a software build's performance on various production benchmarks. A system can measure a software build's performance against a set of instrumentation and diagnostic metrics as shown in FIG. 3, and can generate a score on each metric representing how the software build performed on that metric. Formally, performance data can be expressed as follows:

Let M={$M_1$, $M_2$, $M_3$, $M_4$, $M_5$, $M_6$, $M_7$, $M_n$} be the set of performance metrics.

Let S={$S_1$, $S_2$, $S_3$, $S_4$, $S_5$, $S_6$, $S_7$, $S_n$} be the set of scores on the performance metrics.

$$n_i = \frac{Si - \min(S)}{\max(S) - \min(S)}$$

Where $n_i$ is the ith normalized data and ~(max(S)−min(S)==0), and $n_i$=0.01 (Default normalized score) where (max(S)−min(S)==0) and (Si−min(S)==0).

Furthermore, for the illustrated performance data, min (O)= 25, max(O)=100 and max(O)−min(O)=75. "Categorical Score" denotes how good the performance score is on a categorical scale of A to D, with A being excellent and D not being optimal.

An example performance measurement system can be configured to save production environment and/or test environment performance data, such as illustrated in FIG. 3, in a database such as an Oracle® database, or in an elastic data store such as ELK®. Application instrumentation platforms such as Prometheus®, Sysdog®, Datadog®, AppDynamics®, Sealights® and others can also optionally be used to store performance data.

FIG. 4 illustrates example code for use in connection with identifying clusters of previous builds based on previous build performance data, in accordance with one or more embodiments described herein. Using previous build production environment performance data and baseline scores, a computing system can be configured to conduct an n class classification using Gowers similarity coefficient measures. The n clustering of build performance data can then be used to determine to which class a candidate software build belongs. FIG. 4 illustrates code implementing clustering based on categorical data of build performance indicators using a Gowers similarity coefficient algorithm.

Figure 5:
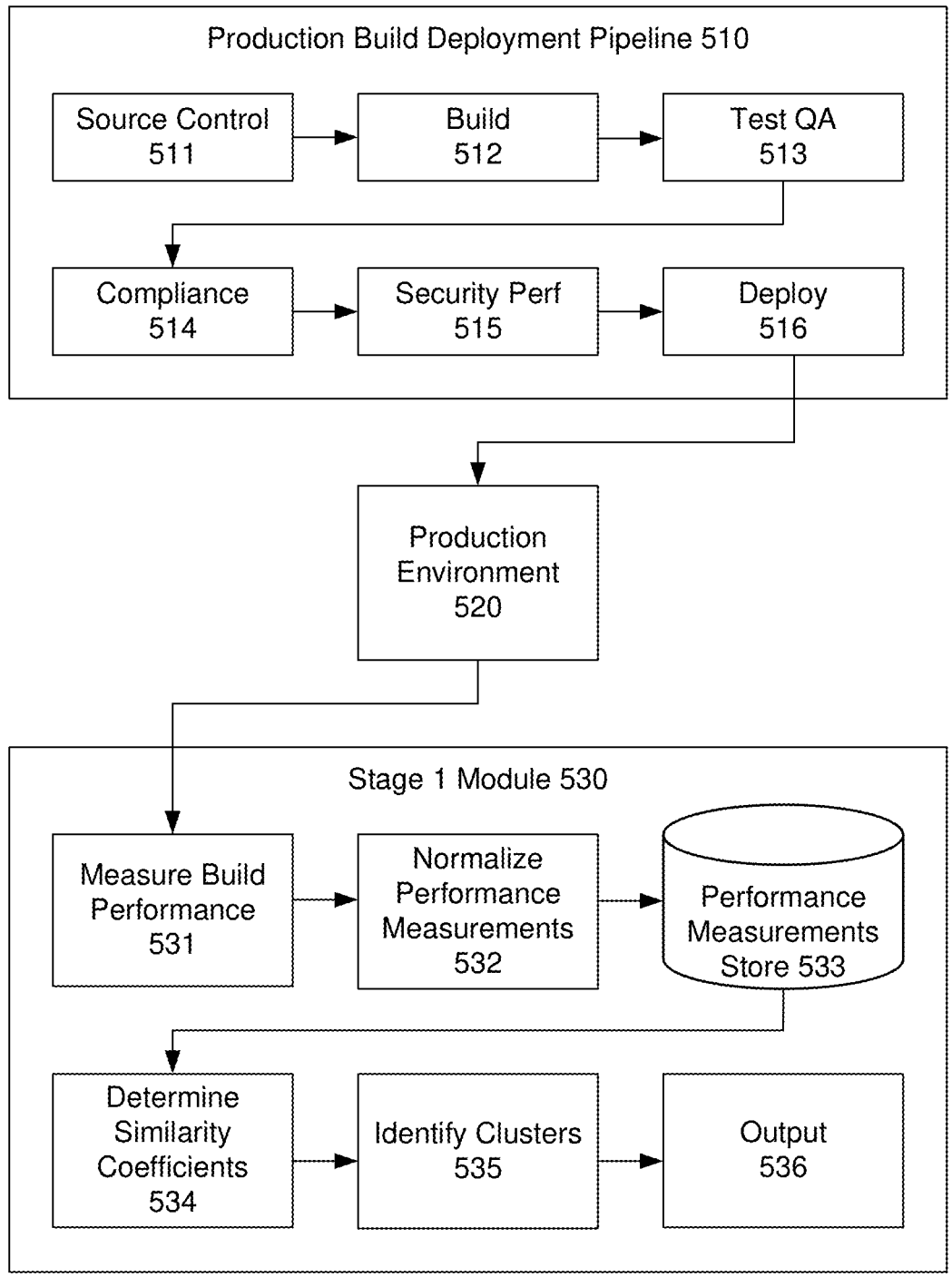
FIG. 5 illustrates example deployment of software builds into a production environment, as well as measurement of build performance data and grouping of builds based on build performance data, in accordance with one or more embodiments described herein.

FIG. 5 illustrates example deployment of software builds into a production environment, as well as measurement of build performance data and grouping of builds based on build performance data, in accordance with one or more embodiments described herein. FIG. 5 includes a production build deployment pipeline 510, a production environment 520, and a stage 1 module 530. The production build deployment pipeline 510 includes source control 511, build 512, test quality assurance (QA) 513, compliance 514, security performance (Perf) 515, and deploy 516. The stage 1 module 530 includes measure build performance 531, normalize performance measurements 532, performance measurements store 533, determine similarity coefficients 534, identify clusters 535, and output 536.

In FIG. 5, the various components of the production build deployment pipeline 510 can be configured to deploy software builds into the production environment 520. After a build is operating in the production environment 520, the stage 1 module can measure its performance, store performance measurements, and perform various other operations that allow useful subsequent comparisons of performance measurement data in connection with embodiments of this disclosure. The stage 1 module 530 can optionally operate in connection with multiple different builds deployed serially in to the production environment 520 over time.

Measure build performance 531 can measure performance of a software build in production environment 520, optionally measuring multiple different performance factors such as those illustrated in FIG. 3, and generating a measurement score for each performance factor. Normalize performance measurements 532 can apply normalizing functions to measurement scores generated by measure build performance 531, thereby generating normalized measurements. The measurement scores and normalized measurements can be stored in the performance measurements store 533.

Determine similarity coefficients 534 can comprise, e.g., using a machine learning model to analyze normalized measurements in the performance measurements store 533, wherein the machine learning module determines Gower's similarity coefficients to define similarity of different builds' performance data. FIG. 4 illustrates example code for use in connection with element 534. Identify clusters 535 can comprise, e.g., a machine learning categorical clustering model adapted to find clusters of build configurations. The output 536 can comprise sets of performance data, each set of performance data associated with a cluster of software builds. The sets of performance data can be subsequently used to compare against test environment performance data associate with a candidate software build, as described herein.

Figure 6:
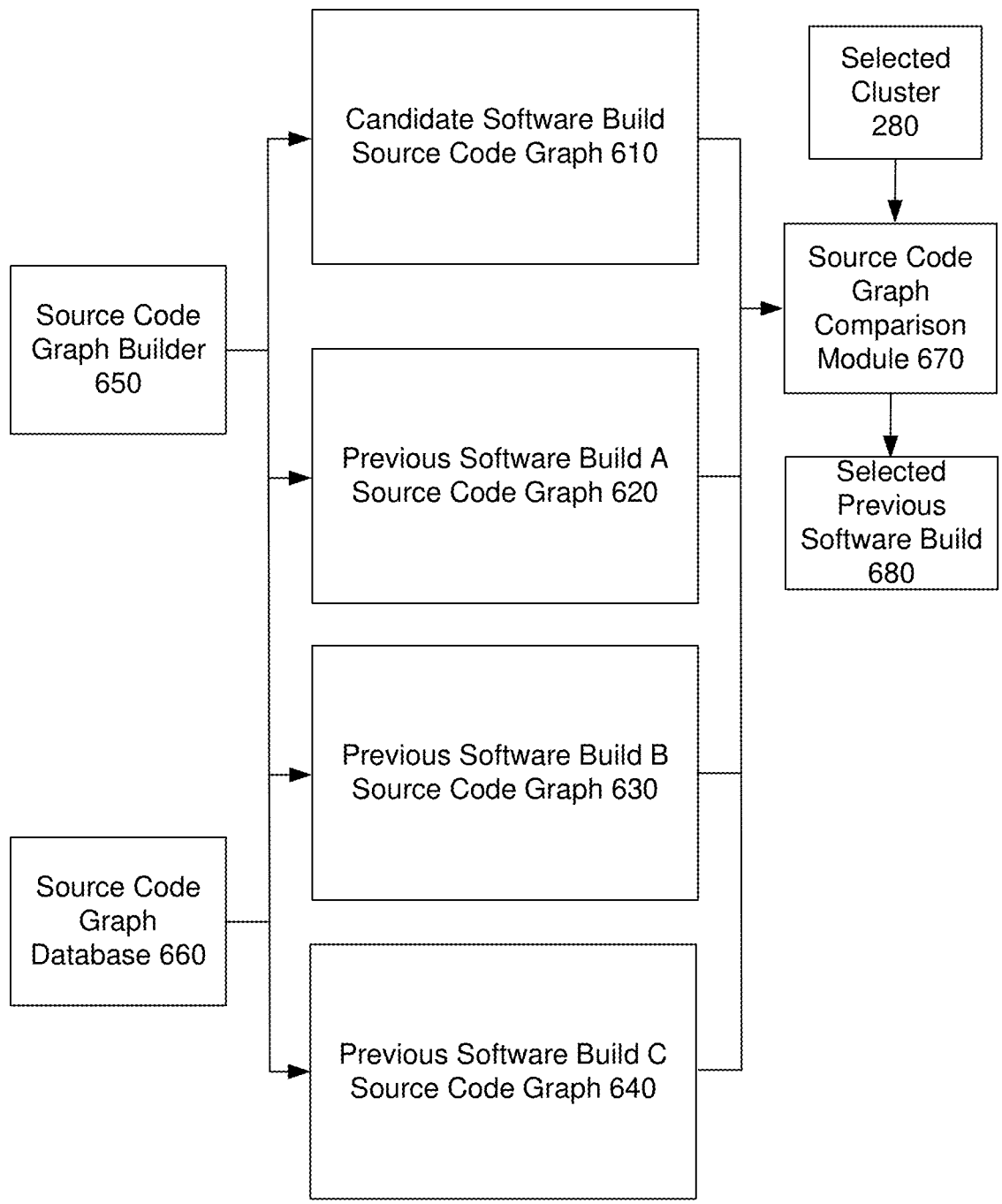
FIG. 6 illustrates an example second stage of the multistage process introduced in FIG. 1, wherein the second stage compares a candidate build source code graph to source code graphs of builds in the cluster of previous builds identified in the first stage, in accordance with one or more embodiments described herein.

FIG. 6 illustrates an example second stage of the multi-stage process introduced in FIG. 1, wherein the second stage compares a candidate build source code graph to source code graphs of builds in the cluster of previous builds identified in the first stage, in accordance with one or more embodiments described herein. FIG. 6 includes source code graph builder 650, source code graph database 660, candidate software build source code graph 610, previous software build A source code graph 620, previous software build B source code graph 630, previous software build C source code graph 640, selected cluster 280, source code graph comparison module 670, and selected previous software build 680.

In an example according to FIG. 6, prior to existence of a candidate software build, the source code graph builder 650 can build the previous software build A, B, and C source code graphs 620, 630, 640, and store these source code graphs, optionally along with other source code graphs, in the source code graph database 660. When a candidate software build is ready for evaluation, the source code graph builder 650 can build the candidate software build source code graph 610, and the candidate software build source code graph 610 can also be stored in the source code graph database 660.

The source code graph comparison module 670 can retrieve source code graphs for software builds included in the selected cluster 280, wherein the selected cluster 280 can be identified as described in connection with FIG. 2. In the illustrated example, previous software builds A, B, and C are the builds included in the selected cluster 280, and so source code graph comparison module 670 can retrieve previous software build A, B, and C source code graphs 620, 630, 640, optionally along with candidate software build source code graph 610, for the purpose of comparing the candidate software build source code graph 610 with the previous software build A, B, and C source code graphs 620, 630, 640.

An example output of the source code graph comparison module 670 can comprise a selected previous software build 680, e.g., a previous software build A, B, or C. The selected previous software build 680 can be a software build, e.g., previous software build A, having a source code graph 620 which is most similar to the candidate software build source code graph 610. Alternatively, the selected previous software build 680 can include multiple previous software builds, e.g., all builds associated with source code graphs that meet a determined similarity criterion, in comparison to candidate software build source code graph 610. In such embodiments, performance predictions for the candidate software build can be based on combinations of performance data associated with the multiple selected previous software builds.

Figure 7:
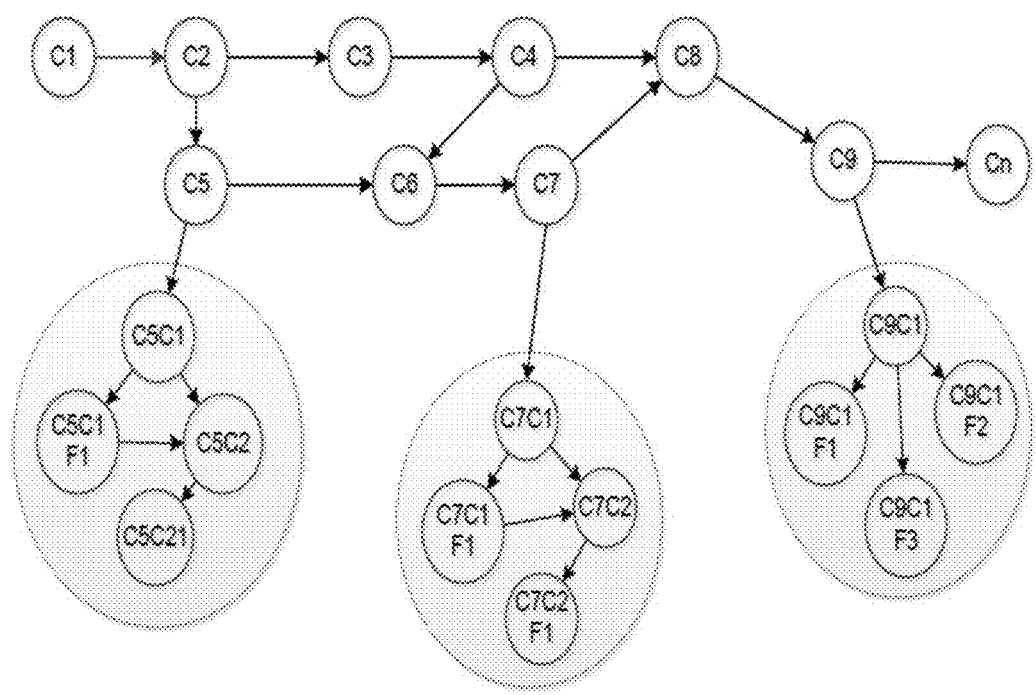
FIG. 7 illustrates an example source code graph, in accordance with one or more embodiments described herein.

FIG. 7 illustrates an example source code graph, in accordance with one or more embodiments described herein. In FIG. 7, C represents a class/module, and F represents a function, method, procedure or line of code. Notation such as C5C1F1 means class C5 is linked to class C1 with a call to function F1.

A software build can comprise a compiled form of a source code, which in itself comprises code entities like class, function, module, procedure or methods. A system such as source code graph builder 650 can use these entities to build a unique source code graph for a software build.

Formally, a source code graph can be expressed as: An n-node graph $G=(N, E)$ with n Nodes and n−1 Edges where: $1<|N|\leq N1$ and $0<|E|\leq N1$:

G=ordered pair directed or an undirected cyclic graph, depending on the relationships between source code entities $N=\{n1, n2, n3, n4, n5, n6, n7, n8, n9, nn\}$ $E=\{\{n1, n2\}, \{n2, n3\}, \{n3, n4\}, \{n4, n5\}, \{n5, n6\}, \{n6, n7\}, \{n7, n8\}, \{n8, n9\}, \{nn-1, nn\}\}$ A source code graph can be conceptually similar to a database schema which describes the objects, tables, relationships, constraints, dependencies and other rules defining the database structure. Tools such as Visual Studio Code Map®, Rigi®, Creole®, CodeCrawler®, Imagix4D® or IBM SA4J®, can be used to create source code graphs. Emerging graph database tools like Neo4j®, Neptune®, JanusGraph® or AnzoGraph® can optionally be used to store, search, and manage source code graphs.

From an implementation point of view, building and storing a source code graph for future analysis can be complex and resource intensive. To handle these operations efficiently, loosely coupled microservices can be designed, rather than monoliths, in order to produce smaller and easier graph structures. Graphs can represent both the syntactic and semantic structure of source code, and deep learning methods can be used to differentiate program structures. Also, code can be modeled as a sequence of tokens or as a syntax tree structure of code. A graph neural networks approach can further enhance source code graph creation.

Figure 8:
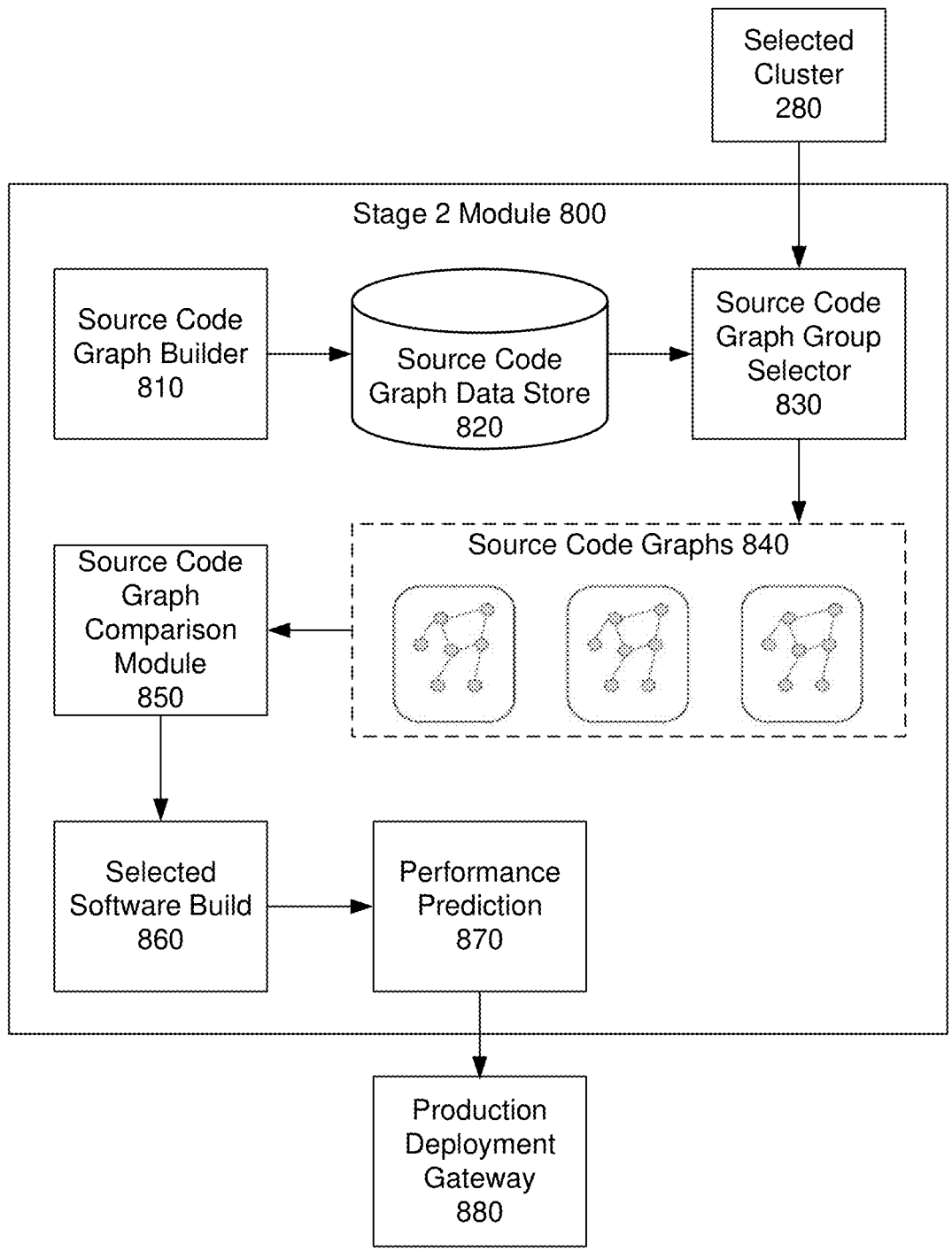
FIG. 8 illustrates an example second stage module configured to retrieve a group of source code graphs based on an output of the first stage, and compare a candidate source code graph with the group of source code graphs in order to identify a selected software build, in accordance with one or more embodiments described herein.

FIG. 8 illustrates an example second stage module configured to retrieve a group of source code graphs based on an output of the first stage, and compare a candidate source code graph with the group of source code graphs in order to identify a selected software build, in accordance with one or more embodiments described herein. FIG. 8 includes a stage 2 module 800, which takes a selected cluster 280 as input, and sends an output comprising performance prediction 870 to a production deployment gateway 880. Example components of the stage 2 module 800 include a source code graph builder 810, a source code graph data store 820, a source code graph group selector 830, source code graphs 840, source code graph comparison module 850, selected software build 860, and performance prediction 870.

In general, with regard to FIG. 8, the stage 1 module 530 illustrated in FIG. 5, or the performance comparison module 270 illustrated in FIG. 2 can provide, e.g., the selected cluster 280 comprising candidate build configurations from identified clusters, based on historical build performance indicators, to the stage 2 module 800. The stage 2 module 800 can use the candidate build configurations identified from stage 1 and load their source code graphs. The stage 2 module 800 can then build a candidate software build source code graph, and conduct graph level classification to identify which previous build's source code graph is most similar to the candidate build's source code graph. The graph level classification can use, e.g., a graph convolutional neural network (GCNN).

Once previous software build(s) are identified by the stage 2 module 800, the stage 2 module 800 can use performance measurement data of the identified previous software build(s) to predict the candidate software build's expected production performance indicators. A resultant predictor classification output from the stage 2 module 800 can then be used, e.g., by production deployment gateway 880, to make an intelligent decision to either allow the deployment of the candidate software build in a production environment, or stop the candidate software build from being deployed, thereby avoiding future possible problems in production.

The source code graph builder 810 can be configured to build a source code graph of a candidate software build, and store the source code graph in the source code graph data store 820, wherein the source code graph data store 820 can also comprise source code graphs of previous software builds.

The source code graph group selector 830 can be configured to retrieve source code graphs 840 from the source code graph data store 820, wherein the source code graphs 840 are associated with the software builds of the selected cluster 280, and wherein the source code graphs 840 can also include the source code graph for the candidate software build.

The source code graph comparison module 850 can then compare the source code graphs 840 with the source code graph for the candidate software build. A graph convolutional neural network can be used by the source code graph comparison module 850. An output of the source code graph comparison module 850 can comprise a selected software build 860.

The selected software build 860 can comprise, e.g., a software build associated with a source code graph of source code graphs 840 which most closely matches the candidate software build source code graph. Performance data associated with the selected software build 860 can then be used as performance prediction 870, or else such performance data can be used to generate performance prediction 870.

The performance prediction 870 can be passed to production deployment gateway 880, wherein production deployment gateway 880 can be configured to use performance prediction 870 to make a determination regarding whether or not to deploy the candidate software build into a production environment. In an example embodiment, when performance prediction 870 passes a performance threshold, then production deployment gateway 880 can approve deployment of the candidate software build into the production environment. Otherwise, production deployment gateway 880 can disapprove deployment of the candidate software build into the production environment.

Figure 9:
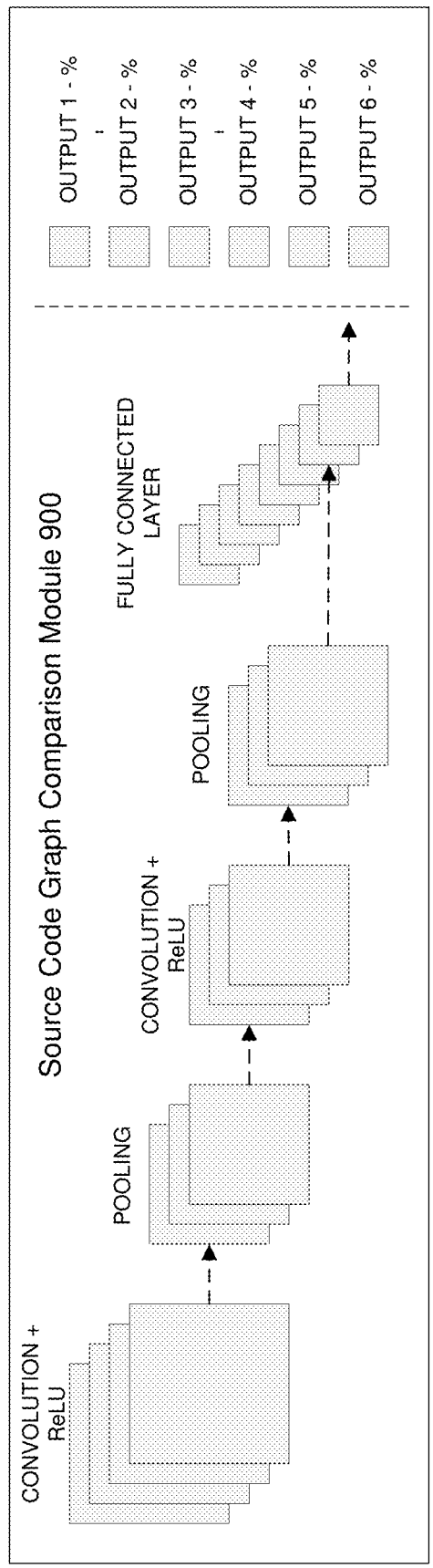
FIG. 9 illustrates an example source code graph comparison module that employs a graph convolutional neural network, in accordance with one or more embodiments described herein.

FIG. 9 illustrates an example source code graph comparison module that employs a graph convolutional neural network, in accordance with one or more embodiments described herein. Source code graph comparison module 900 can be configured to conduct a series of convolution and pooling operations, as shown, resulting in a fully connected layer. The outputs, e.g., outputs 1, 2, 3, etc., can each comprise a percentage value representative of a similarity between a candidate software build source code graph and a previous software build source code graph. A previous software build associated with an output of, e.g., a highest percentage value, can be the most similar to the candidate software build, and such a previous software build can be selected for use in predicting the performance of the candidate software build.

Figure 10:
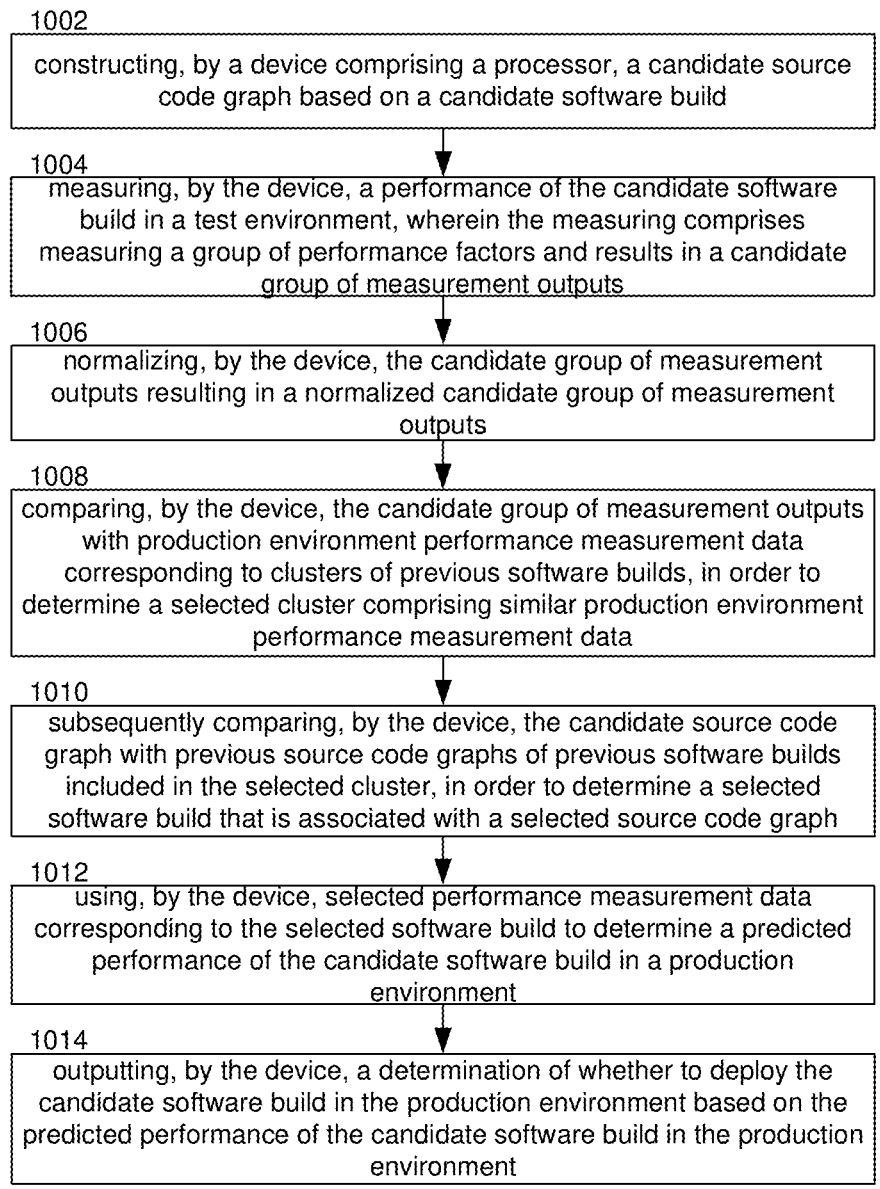
FIG. 10 is a flow diagram of an example, non-limiting computer implemented method to predict production environment performance of a candidate software build, in accordance with one or more embodiments described herein.

FIG. 10 is a flow diagram of an example, non-limiting computer implemented method to predict production environment performance of a candidate software build, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

Figure 13:
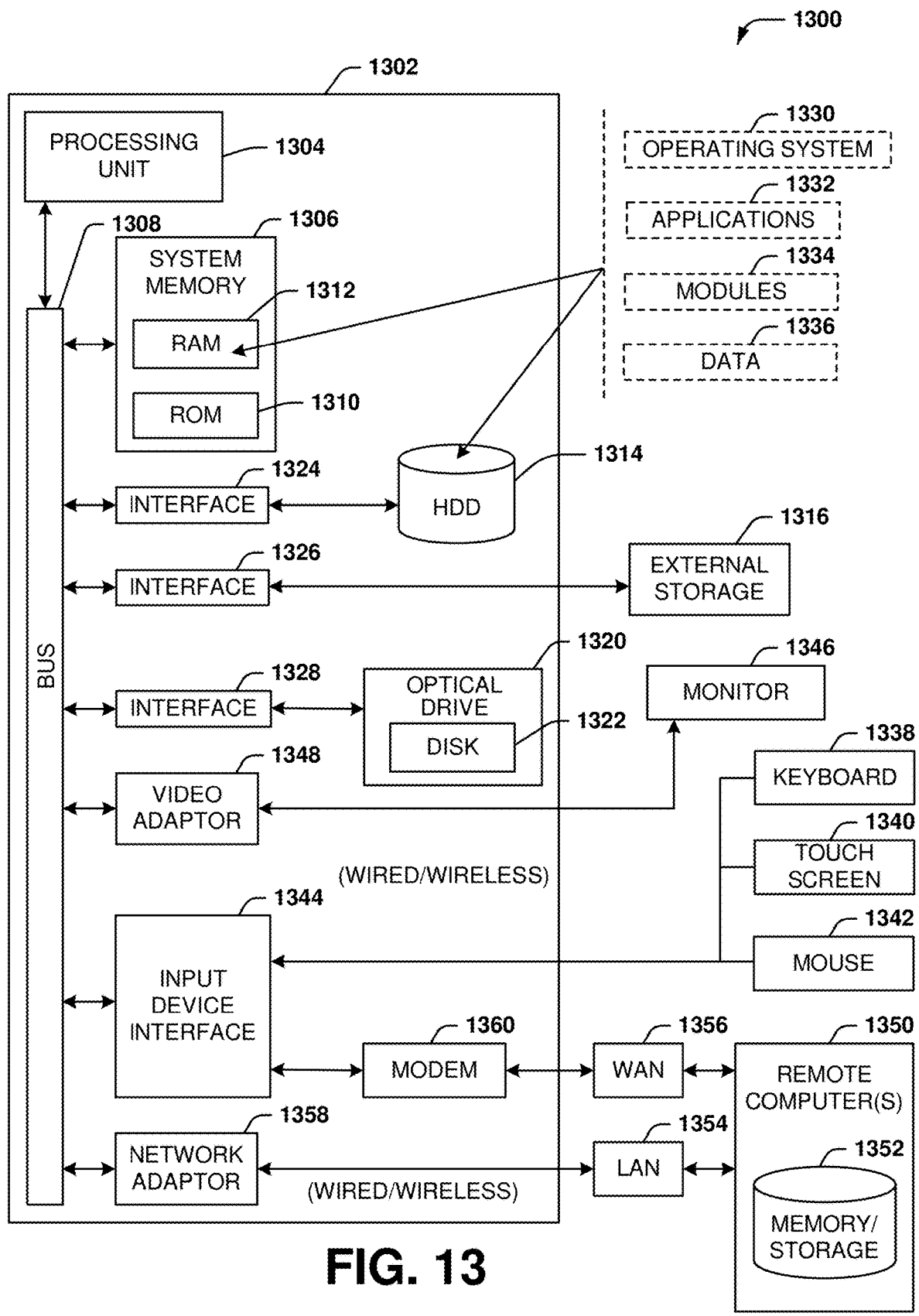
FIG. 13 illustrates a block diagram of an example computer operable to provide any of the various devices described herein.

In an embodiment, the method illustrated in FIG. 10 can be performed by a computing system comprising one or more computing devices such as illustrated in FIG. 13. The computing system can be equipped with functional modules implementing, e.g., the various elements illustrated in FIGS. 1-9.

Operation 1002 comprises constructing, by a device comprising a processor, a candidate source code graph 610 based on a candidate software build. Operation 1004 comprises measuring, by the device, a performance of the candidate software build in a test environment, wherein the measuring comprises measuring a group of performance factors and results in a candidate group of measurement outputs, e.g., candidate software build performance data 210. Operation 1006 comprises normalizing, by the device, the candidate group of measurement outputs resulting in a normalized candidate group of measurement outputs.

Operation 1008 comprises comparing, by the device, the candidate group of measurement outputs 210 with production environment performance measurement data, e.g., 220, 230, and 240, corresponding to clusters of previous software builds, in order to determine a selected cluster 280 comprising similar production environment performance measurement data. At operation 1008, the similar production environment performance measurement data can have, e.g., a higher similarity to the candidate group of measurement outputs 210 than production environment performance measurement data associated with at least one non-selected cluster of the clusters. For example, the similar production environment performance measurement data of the selected cluster 280 can be determined to have a highest similarity to the candidate group of measurement outputs 210.

Also, comparing the candidate group of measurement outputs 210 with the production environment performance measurement data 220, 230, and 240 corresponding to the clusters of previous software builds can use the normalized candidate group of measurement outputs produced at operation 1006.

In some embodiments, comparing the candidate group of measurement outputs 210 with the production environment performance measurement data 220, 230, and 240 corresponding to the clusters of previous software builds can comprise determining similarity coefficients, e.g., Gower similarity coefficients, corresponding to the clusters of previous software builds.

Operation 1010 comprises subsequently comparing, by the device, the candidate source code graph 610 with previous source code graphs 620, 630, and 640 of previous software builds included in the selected cluster 280, in order to determine a selected software build 680 that is associated with a selected source code graph, e.g., software build A, associated with source code graph 620. The selected source code graph 620 can have a higher similarity to the candidate source code graph 610 than at least one non-selected source code graph, e.g., source code graph 630, of the previous source code graphs 620, 630, and 640 included in the selected cluster 280. For example, the selected source code graph 620 of the selected software build 680 can be determined to have a highest similarity to the candidate source code graph 610.

In some embodiments, subsequently comparing the candidate source code graph 610 with the previous source code graphs 620, 630, and 640 of the previous software builds included in the selected cluster 280 can use a graph convolutional neural network model.

Operation 1012 comprises using, by the device, selected performance measurement data corresponding to the selected software build 680 to determine a predicted performance, e.g., performance prediction 870, of the candidate software build in a production environment 520. Operation 1014 comprises outputting, by the device, a determination of whether to deploy the candidate software build in the production environment 520 based on the predicted performance 870 of the candidate software build in the production environment 520.

Figure 11:
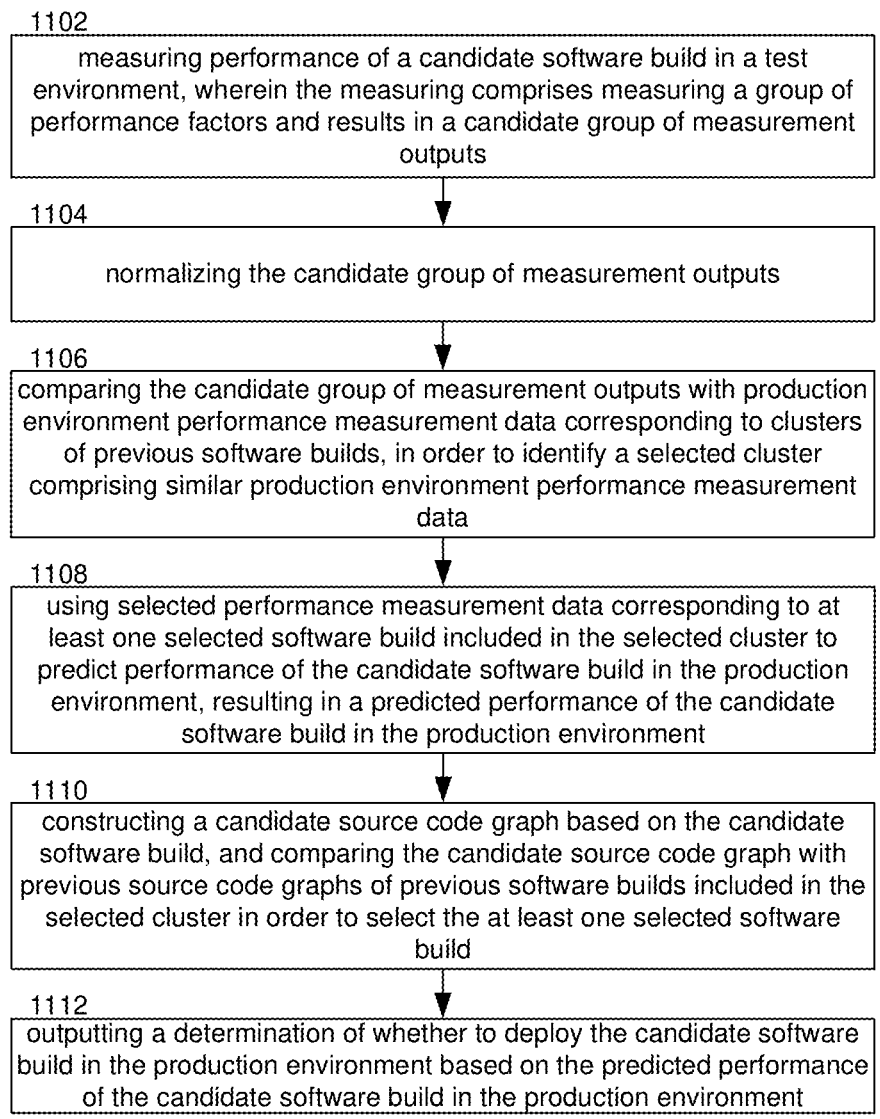
FIG. 11 is a flow diagram of another example, non-limiting computer implemented method to predict production environment performance of a candidate software build, in accordance with one or more embodiments described herein.

FIG. 11 is a flow diagram of another example, non-limiting computer implemented method to predict production environment performance of a candidate software build, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 11 can be performed by a computing system comprising one or more computing devices such as illustrated in FIG. 13. The computing system can be equipped with functional modules implementing, e.g., the various elements illustrated in FIGS. 1-9.

Operation 1102 comprises measuring performance of a candidate software build in a test environment, wherein the measuring comprises measuring a group of performance factors and results in a candidate group of measurement outputs, e.g., the candidate software build performance data 210. Operation 1104 comprises normalizing the candidate group of measurement outputs 210, e.g., as discussed herein in connection with FIG. 3.

Operation 1106 comprises comparing the candidate group of measurement outputs 210 with production environment performance measurement data 220, 230, 240 corresponding to clusters of previous software builds, in order to identify a selected cluster 280 comprising similar production environment performance measurement data, e.g., performance data 220, which can be similar to the candidate group of measurement outputs 210. The similar production environment performance measurement data 220 can have, e.g., a higher similarity to the candidate group of measurement outputs 210 than at least one non-selected cluster of the clusters, e.g., than a cluster corresponding to performance data 230 or 240. Comparing the candidate group of measurement outputs 210 with the production environment performance measurement data 220, 230, 240 corresponding to the clusters of previous software builds can use a normalized candidate group of measurement outputs 210, as described herein.

In an example, operation 1106 can comprise determining similarity coefficients that establish similarity between the candidate group of measurement outputs 210 and the production environment performance measurement data 220, 230, 240 corresponding to clusters of previous software builds. Similarity coefficients, and Gower's similarity coefficients in particular, can also be used to identify clusters of previous software builds, based on similarities in the previous software builds' production performance data.

Operation 1108 comprises using selected performance measurement data corresponding to at least one selected software build included in the selected cluster 280 to predict performance of the candidate software build in the production environment 520, resulting in a predicted performance of the candidate software build in the production environment 520. One approach to operation 1108 can comprise, e.g., operation 1110.

Operation 1110 comprises constructing a candidate source code graph 610 based on the candidate software build, and comparing the candidate source code graph 610 with previous source code graphs 620, 630, 640 of previous software builds included in the selected cluster 280 in order to select the at least one selected software build 680. The at least one selected software build 680 can be associated with a selected source code graph, e.g., 620, and the selected source code graph 620 can have a higher similarity to the candidate source code graph 610 than at least one non-selected source code graph 630, 640 of the previous source code graphs 620, 630, 640 included in the selected cluster 280. In an embodiment, comparing the candidate source code graph 610 with the previous source code graphs 620, 630, 640 of the previous software builds included in the selected cluster 280 can use a graph convolutional neural network model.

Operation 1112 comprises outputting a determination of whether to deploy the candidate software build in the production environment 520 based on the predicted performance of the candidate software build in the production environment 520.

Figure 12:
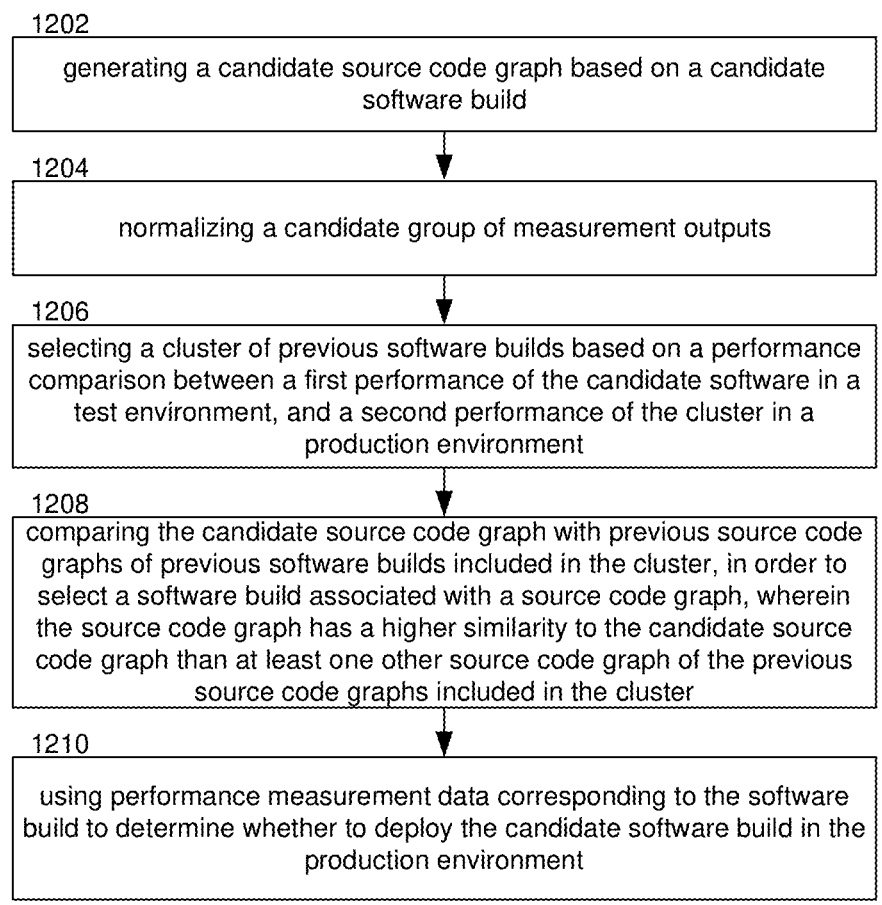
FIG. 12 is a flow diagram of another example, non-limiting computer implemented method to predict production environment performance of a candidate software build, in accordance with one or more embodiments described herein.

FIG. 12 is a flow diagram of another example, non-limiting computer implemented method to predict production environment performance of a candidate software build, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 11 can be performed by a computing system comprising one or more computing devices such as illustrated in FIG. 13. The computing system can be equipped with functional modules implementing, e.g., the various elements illustrated in FIGS. 1-9.

Operation 1202 comprises generating a candidate source code graph 610 based on a candidate software build. Operation 1204 comprises normalizing a candidate group of measurement outputs 210, e.g., performance measurement outputs associated with the candidate software build.

Operation 1206 comprises selecting a cluster 280 of previous software builds based on a performance comparison between a first performance of the candidate software in a test environment, and a second performance, e.g., of the cluster 280 or of a previous build within the cluster 280, in a production environment. The performance comparison can comprise a comparison between a candidate group of measurement outputs 210 associated with the candidate software build, and production environment performance measurement data, e.g., 220, associated with the cluster 280. Furthermore, comparing the candidate group of measurement outputs 210 with the production environment performance measurement data 220 associated with the cluster 280 can comprise determining a similarity coefficient corresponding to a similarity between the candidate group of measurement outputs 210 and the production environment performance measurement data 220 associated with the cluster 280. Also, comparing the candidate group of measurement outputs 210 with the production environment performance measurement data 220 associated with the cluster 280 can use a normalized candidate group of measurement outputs, generated at operation 1204.

Operation 1208 comprises comparing the candidate source code graph 610 with previous source code graphs 620, 630, 640 of previous software builds included in the cluster 280, in order to select a software build 680 associated with a source code graph, e.g., source code graph 620. Comparing the candidate source code graph 610 with the previous source code graphs 620, 630, 640 of the previous software builds included in the cluster 280 can use a graph convolutional neural network model. The source code graph 620 can have a higher similarity to the candidate source code graph 610 than at least one other source code graph 630, 640 of the previous source code graphs 620, 630, 640 included in the cluster 280.

Operation 1210 comprises using performance measurement data corresponding to the software build 680 to determine whether to deploy the candidate software build in the production environment 520.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/ wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

constructing, by a device comprising a processor, a candidate source code graph based on a candidate software build, wherein the candidate software build comprises enterprise software generated for execution in an enterprise software production environment, and wherein the candidate source code graph comprises at least one node that represents a first class of the candidate software build and a second class of the candidate software build that are linked with a call to a function of the candidate software build;

measuring, by the device, a performance of the candidate software build in a test environment utilizing hardware devices and interfaces that are not accessible to clients of the enterprise software production environment, wherein the measuring comprises measuring a group of performance factors and results in a candidate group of measurement outputs;

comparing, by the device, the candidate group of measurement outputs with production environment performance measurement data corresponding to clusters, each comprising respective previous software builds, in order to determine a selected cluster of previous software builds comprising, in aggregate, similar production environment performance measurement data, wherein the similar production environment performance measurement data has a higher similarity, according to a defined measurement similarity criterion, to the candidate group of measurement outputs than production environment performance measurement data associated with at least one non-selected cluster of the clusters, and wherein the production environment performance measurement data comprises performance measurement data associated with execution of the previous software builds in the enterprise software production environment;

subsequently comparing, by the device, the candidate source code graph with previous source code graphs of previous software builds included in the selected cluster, in order to determine a selected software build that is associated with a selected source code graph, wherein the selected source code graph has a higher similarity, according to a defined graph similarity criterion, to the candidate source code graph than at least one non-selected source code graph of the previous source code graphs included in the selected cluster; and using, by the device, selected performance measurement data corresponding to the selected software build to determine a predicted performance of the candidate software build in a production environment.

2. The method of claim 1, further comprising normalizing, by the device, the candidate group of measurement outputs resulting in a normalized candidate group of measurement outputs, and wherein comparing the candidate group of measurement outputs with the production environment performance measurement data corresponding to the clusters of previous software builds uses the normalized candidate group of measurement outputs.

3. The method of claim 1, wherein comparing the candidate group of measurement outputs with the production environment performance measurement data corresponding to the clusters of previous software builds comprises determining similarity coefficients representative of similarity between the candidate group of measurement outputs and the production environment performance measurement data corresponding to the clusters of previous software builds.

4. The method of claim 3, wherein the similarity coefficients comprise Gower similarity coefficients.

5. The method of claim 1, wherein subsequently comparing the candidate source code graph with the previous source code graphs of the previous software builds included in the selected cluster uses a graph convolutional neural network model.

6. The method of claim 1, further comprising outputting, by the device, a determination of whether to deploy the candidate software build in the production environment based on the predicted performance of the candidate software build in the production environment.

7. The method of claim 1, wherein the similar production environment performance measurement data of the selected cluster is determined to have a highest similarity to the candidate group of measurement outputs according to the defined measurement similarity criterion.

8. The method of claim 1, wherein the candidate source code graph represents calls to multiple microservices.

9. A system, comprising:

a processor; and a memory that stores executable instructions that, when executed by the processor, facilitate performance of operations, the operations comprising:

constructing a candidate source code graph based on a candidate software build, wherein the candidate source code graph comprises at least one node that represents a first class of the candidate software build and a second class of the candidate software build that are linked with a call to a function of the candidate software build;

measuring performance of a candidate software build in a test environment separate from an enterprise software production environment, wherein the candidate software build comprises enterprise software configured to be executed in the enterprise software production environment, and wherein the measuring comprises measuring a group of performance factors and results in a candidate group of measurement outputs;

comparing the candidate group of measurement outputs with production environment performance measurement data corresponding to clusters, each comprising respective previous software builds, in order to determine a selected cluster of previous software builds comprising, in aggregate, similar production environment performance measurement data, wherein the similar production environment performance measurement data has a higher similarity to the candidate group of measurement outputs than at least one non-selected cluster of the clusters, and wherein the production environment performance measurement data comprises performance measurement data associated with execution of the previous software builds in the enterprise software production environment; and using selected performance measurement data corresponding to at least one selected software build included in the selected cluster to predict performance of the candidate software build in the production environment, resulting in a predicted performance of the candidate software build in the production environment.

10. The system of claim 9, wherein the operations further comprise comparing the candidate source code graph with previous source code graphs of previous software builds included in the selected cluster in order to select the at least one selected software build.

11. The system of claim 10, wherein the at least one selected software build is associated with a selected source code graph, and wherein the selected source code graph has a higher similarity to the candidate source code graph than at least one non-selected source code graph of the previous source code graphs included in the selected cluster.

12. The system of claim 10, wherein comparing the candidate source code graph with the previous source code graphs of the previous software builds included in the selected cluster uses a graph convolutional neural network model.

13. The system of claim 9, wherein the operations further comprise normalizing the candidate group of measurement outputs, and wherein comparing the candidate group of measurement outputs with the production environment performance measurement data corresponding to the clusters of previous software builds uses a normalized candidate group of measurement outputs.

14. The system of claim 9, wherein comparing the candidate group of measurement outputs with the production environment performance measurement data corresponding to the clusters of previous software builds comprises determining similarity coefficients that establish similarity between the candidate group of measurement outputs and the production environment performance measurement data corresponding to clusters of previous software builds.

15. The system of claim 9, wherein the operations further comprise outputting a determination of whether to deploy the candidate software build in the production environment based on the predicted performance of the candidate software build in the production environment.

16. A non-transitory machine-readable medium, comprising executable instructions that, when executed by a processor, facilitate performance of operations, the operations comprising:
generating a candidate source code graph based on a candidate software build, wherein the candidate software build comprises enterprise software made for execution in an enterprise software production environment, and wherein the candidate source code graph comprises at least one node that represents a first class of the candidate software build and a second class of the candidate software build that are linked with a call to a function of the candidate software build;
selecting a cluster of previous software builds based on a performance comparison between a first performance of the candidate software in a test environment utilizing hardware devices and interfaces that are not accessible to clients of the enterprise software production environment, and a second performance of the cluster of previous software builds in the enterprise software production environment;
comparing the candidate source code graph with previous source code graphs of previous software builds included in the cluster of previous software builds, in order to select a software build associated with a source code graph, wherein the source code graph has a higher similarity to the candidate source code graph than at least one other source code graph of the previous source code graphs included in the cluster of previous software builds; and
using performance measurement data corresponding to the software build to determine whether to deploy the candidate software build in the enterprise software production environment.

17. The non-transitory machine-readable medium of claim 16, wherein the performance comparison comprises a comparison between a candidate group of measurement outputs associated with the candidate software build, and production environment performance measurement data associated with the cluster of previous software builds.

18. The non-transitory machine-readable medium of claim 17, wherein comparing the candidate group of measurement outputs with the production environment performance measurement data associated with the cluster comprises determining a similarity coefficient corresponding to a similarity between the candidate group of measurement outputs and the production environment performance measurement data associated with the cluster of previous software builds.

19. The non-transitory machine-readable medium of claim 17, wherein the operations further comprise normalizing the candidate group of measurement outputs, and wherein comparing the candidate group of measurement outputs with the production environment performance measurement data associated with the cluster of previous software builds uses a normalized candidate group of measurement outputs.

20. The non-transitory machine-readable medium of claim 16, wherein comparing the candidate source code graph with the previous source code graphs of the previous software builds included in the cluster of previous software builds uses a graph convolutional neural network model.

* * * * *